United States Patent Office 3,220,643
Patented Nov. 30, 1965

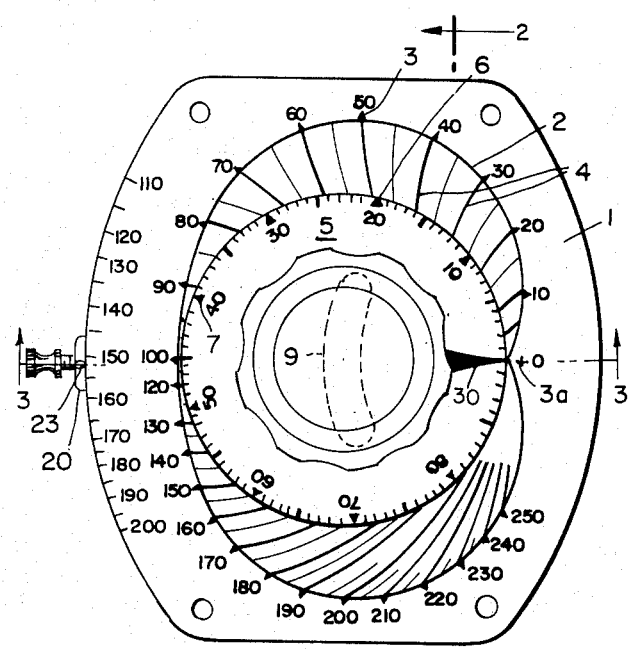

3,220,643
NAVIGATION INSTRUMENT
Kenneth P. Gorman, 480 S. Main St., Randolph, Mass.
Filed Oct. 1, 1963, Ser. No. 313,008
14 Claims. (Cl. 235—61)

The present invention relates to a measuring device and more particularly to a navigational aid.

It is an object of the present invention to provide a navigational aid which is particularly useful in connection with the location of aircraft in transit. The invention is designed primarily for use by aircraft while moving between two given points for the purpose of determining or estimating the time of arrival at and distance to a given destination, as well as estimated aircraft speed, and elapsed time and distance from a given point of origination.

A further object of the present invention is to provide a relatively inexpensive and simple navigational aid for use by pilots and others, for rapid and efficient time, distance and location calculations. A further object of this invention is to provide a means and method by which individuals, and particularly pilots, in transit may make their position and estimated times of arrival known quickly to control stations.

The present invention also provides a means and method for indicating, during flight, on a continuous and instantaneous basis, the running time and estimated craft position between two given points.

The present invention also provides a means and method which is useful in aircraft flights under both VFR and IFR conditions for estimating time and distance from or to specified omnipoints or check points. A further advantage of the present invention is that it provides an accurate simple means for precisely determining the actual ground speed of the aircraft while in flight.

A further object of the present invention invention is to provide a simple means which may be adapted in principle for use in ground control systems whereby the positions or projected positions of a plurality of aircraft may be continually monitored. In this embodiment a plurality of units made in accordance with the present invention may be contained in a console with each unit designed to monitor an individual aircraft and with the information supplied by each unit adapted to be correlated by a controller.

These and other objects and advantages of the present invention will be more clearly understood when considered in conjunction with a preferred embodiment of the invention which is illustrated in the drawings in which:

FIG. 1 is a top plan view of a preferred embodiment of the invention;

FIG. 2 is a cross sectional view taken along the line 2—2 of FIG. 1;

FIG. 3 is a cross sectional view taken along the line 3—3 of FIG. 1; and

FIG. 4 is a cross sectional view from the bottom taken along the line 4—4 of FIG. 2.

In the preferred embodiment illustrated in the drawings there is provided an instrument panel 1 having a face or surface upon which is graphically inscribed or displayed, means for indicating distance. This means for indicating distance preferably comprises a series of nonparallel linear means, such as the inscribed lines or leads 4, which generally arcuately converge from the periphery 3 toward the point 3A on the periphery 3, which indicates the minimum distance graphically displayed. In the illustrated embodiment the leads 4 indicate miles or other suitable distances such as kilometers, etc., from 0 to 250. But this illustration is exemplary, as other distances may be used. The graph illustrated is calibrated in five mile intervals, with only the ten mile intervals being numbered. If desired, closer calibrations or wider calibrations may be used.

An indicator means having a dial 5 is positioned above and in facing relation to the instrument face 1. The dial 5 has a circular periphery 6 radially calibrated in time, with the time illustrated indicated in minutes, as indicated by the markings 7. The dial 5 which is calibrated into 90 minutes is supported on and is rotated about its axis by shaft 8, which is secured at one end to the dial and projects through an enlarged opening 9 in the instrument panel 1. Also rigidly secured to the dial 5 is knob 11. If desired, the knob 11 may be secured to the shaft 8 by a set screw 12 and the shaft 8 may in turn be keyed by a suitable key to the dial 5. The shaft 8 is adapted to rotate at a constant rate consistent with the calibration on the dial 5. Thus the shaft 8 in the embodiment described will rotate once every 90 minutes.

This shaft 8 extends from and is rotated by the timing mechanism 14. This timing mechanism 14 may be of any conventional type. Thus, for example, one may use a timing mechanism made by Robert Shaw Controls Company, Lux Time Division, of Lebanon, Tennessee, 1600 Series. In this particular mechanism, the timer may be wound by rotating the knob 11 in a clockwise direction. On release of the knob the shaft 8 will start to rotate at the desired rate of speed in a counterclockwise direction as viewed in FIG. 1. The timer mechanism 14, which in turn supports the shaft 8, dial 5 and knob 11, is, itself, supported on a pivoted lever arm 15. This pivoted lever arm 15 is positioned parallel to and beneath the instrument face 1. One end of the lever arm 15 is pivotally secured and supported on pin 16 which, as viewed in FIG. 3, is secured at its upper end to the bottom surface of the instrument face 1. A helical coil spring 17 is coaxially mounted on the pin 16. A nut 18 which is adjustably threaded on the pin 16 may be tightened or loosened so that the pressure of spring 17 against the lower surface of lever 15 may be adjusted to control the ease with which the lever 15 may be rotated about the pin 16. The axis of pin 16 and the pivot point about which lever arm 15 pivots lie in a line coincident with a line normal to the instrument panel and passing through the distance point 3A. This permits rotation of dial 5 over an arc within the periphery of the graphic display on the panel and about a center coincident with the point indicated by the character 3A.

Lever 16 is provided with a lip 20 at the end opposite pin 16. This lip 20 projects upwardly, as viewed in FIG. 3, adjacent to the periphery of the instrument face 1. A thumb screw 21 is threaded through an opening in the lip 20 and is adapted to be threaded into engaging and securing relationship with the edge of the instrument face 1 so that the lever 15 may be locked in any selected position of rotation. The edge of the instrument face 1 in the area of the lip 20 is formed along an arc having its center coincident with pin 16. The lip 20 may, if desired, be provided with an indexing line 23 (FIG. 1).

A speed calibration is provided along the edge of the instrument face in the area over which lip 20 may be pivoted. In the embodiment illustrated, the speed calibration indicates ground speed of aircraft from 110 to 200 miles per hour.

The slot 9 in the instrument face 1 through which shaft 8 projects is sufficient to allow shaft 8 to be pivoted over an arc so that the lip 20 may be adjusted to coincide with any point along the ground speed calibration.

The instrument may be provided with an enclosure consisting of a casing 27 the edges of which engage the periphery of the instrument face 1 with a slot 28 in the casing 27 beneath the ground speed calibrations on the instrument face, so that the lever arm 15 may be pivoted along the length of the slot beneath the ground speed calibration.

When the instrument is used in connection with navigation of an aircraft, the pilot selects the speed setting that he estimates corresponds with the speed of the craft. He then loosens the set screw 21 and pivots the lever 15 until the indicator 23 coincides with the ground speed calibration corresponding with the ground speed that he has estimated. The pilot then turns the knob 11 clockwise at least one complete revolution until the arrow 30 on the dial concides with 0 mile calibration at the time the craft is passing over or is departing from an originating check point or a known point of origination. The pilot then consults his chart and notes the distance between the point of origination and the next check point. Thus if the first check point through which the pilot must fly is fifty miles from the point of origination, he may make a penciled mark or other suitable mark on the instrument face at 50 miles. For this purpose, the instrument face may be provided with a suitable erasable surface. As soon as the pilot has completed these steps, he immediately can tell by inspection, the time it will take to travel the first fifty miles. Thus, for example, if his estimated ground speed is 150 miles per hour it will take the pilot exactly 20 minutes to travel the 50 mile distance. This can be determined by inspection of the dial, for the 20 minute marker on the dial is substantially coincident with the lead line from the 50 mile indicator. As a pilot continues to travel from the point of origination to the second check point 50 miles away, the dial will rotate and will continue to indicate to him the decreasing amount of time that it will take him to reach the second check point. Thus, at any time the pilot may, by merely looking at the intersection of the dial periphery and the 50 mile lead, see how many minutes to go he has before he reaches the second check point. In addition, the pilot can instantly determine how long he has been flying by reading from the 0 mile point to the arrow on the dial which will give him the time that has elapsed since leaving the point of origination. In addition, the arrow on the dial will indicate the pilot's estimated position between the point of origination and the point of destination. When the arrow reaches the 50 mile mark the pilot, if his calculations have been correct, will know that he is directly over the second check point. If, for some reason, the pilot has miscalculated his ground speed he will arrive at the first check point either before or after the arrow on the dial reaches the 50 mile marker. If that occurs, the pilot can immediately determine the amount of error in his estimated ground speed from the actual ground speed at which he has been traveling. For example, if the pilot arrived at the second check point when the dial arrow was pointing at 45 miles, rather than 50 miles, the pilot knows that he underestimated his ground speed. The amount of error can be determined by readjusting lever 15 and advancing the estimated ground speed at the moment the pilot passes over the second check point, so that the arrow is promptly aligned with the 50 mile lead. The pilot will then note that the lead 23 now coincides with a ground speed of 166 miles an hour. This will indicate to the pilot that he underestimated his ground speed by approximately 16 miles per hour.

What is claimed is:

1. A navigational aid comprising graphic means defining a series of finite distances,
    indicator means having time calibrations arranged about a central axis and adapted to be driven at a speed corresponding to one variable,
    said axis being adjustable with respect to said graphic means, and
    means for bodily changing the proximate relation of said graphic means and said time calibrations by moving said central axis with respect to said graphic means.

2. A navigational aid as set forth in claim 1 having means providing speed calibrations for use in connection with said means for changing said proximate relation of said graphic means and said time calibrations whereby said time calibrations may be moved into selected proximate relations with said graphic means related to selected calibrations of said means providing speed calibrations.

3. A navigational aid comprising a graphic display defining a series of finite distances with adjacently defined distances graphically depicted by nonparallel linear means,
    indicator means comprising a dial having time calibrations arranged radially about an axis,
    support means for said indicator means whereby said indicator may rotate about said axis with said calibrations in proximate relations with said graphic display, and
    means for adjustably positioning bodily said dial with said axis in different selected positions of proximate relation to said graphic display whereby said calibrations may be positioned to rotate about said axis over different portions of said graphic display.

4. A navigational aid comprising a graphic display defining a series of finite distances with adjacently defined distances graphically depicted by nonparallel linear means,
    indicator means comprising a dial having time calibrations arranged radially about an axis,
    support means for said indicator means whereby said indicator may rotate about said axis with said calibrations in proximate relation with said graphic display, and
    means for adjustably positioning said support means bodily whereby said axis may be moved into different positions relative to said graphic display and said calibrations may rotate over said linear means at different positions, and
    means correlated to said different positions over which said calibrations may move for indicating relative speeds.

5. A navigational aid comprising an instrument panel having graphically displayed thereon a series of successive finite distances with adjacent distances depicted by nonparallel linear means,
    indicator means comprising a dial having time calibrations arranged radially about an axis,
    support means for said indicator means positioning said axis normal to said panel with said dial lying in facing adjacent relation to said nonparallel linear means and adapted to be rotated about said axis,
    means for rotating said dial about said axis at a constant rate of speed,
    means for adjustably positioning said dial in a plurality of selected positions normal to and adjacent said linear means whereby said dial may be positioned for intersection of its calibrations on rotation with different portions of said linear means, and
    speed indicating means operably interengaged with said adjustably positioning means for measuring speed in relation to time as measured on said indicator means and distance as measured on said instrument panel.

6. A navigational aid as set forth in claim 5 wherein said support means includes a shaft coaxial with said axis and projecting through an opening in said instrument panel with said shaft secured at opposite ends to said adjustably positioning means on one side and said dial on the other side of said panel.

7. A navigational aid as set forth in claim 5 wherein, said adjustable positioning means includes a lever arm, means pivotally securing one end of said lever arm with the other end extending parallel to said instrument panel and with said shaft interengaged with said lever arm intermediate its ends.

8. A navigational aid as set forth in claim 7 wherein said lever arm has indicating means secured to its free end with said lever arm indicating means positioned to move with said lever arm indicating means and indicate relative speed on said speed indicating means.

9. A navigational aid as set forth in claim 5 wherein said graphic display includes a series of nonparallel linear means generally converging along arcuate paths toward a point which represents the minimum distance graphically displayed.

10. A navigational aid as set forth in claim 9 wherein said point is located on the periphery of said graphic display.

11. A navigational aid as set forth in claim 9 wherein said dial is positioned to be adjusted over an arc having a center coincident with said minimum distance point.

12. A navigational aid as set forth in claim 11 wherein said adjustable positioning means includes a lever arm, means pivotally supporting said lever arm at a pivot point lying in an axis normal to said panel and passing through said minimum distance point.

13. A navigational aid as set forth in claim 12 wherein said lever arm lies parallel to said instrument panel,
   a shaft coaxial with the axis of said dial and projecting through an opening in said panel, with said shaft secured at opposite ends to said dial on one side and an intermediate portion of said lever arm on the other side of said panel.

14. A navigational aid comprising an instrument panel having graphically displayed thereon a series of non-parallel linear means generally converging from a periphery toward a point on said periphery which indicates the minimum distance graphically displayed,
   indicator means having a dial with time calibrations arranged radially about the periphery of said dial,
   a shaft secured at one end to the axis of said dial and extending normally therefrom through an enlarged opening in said panel and supporting said dial for movement parallel to said panel and over an arc within the periphery of said graphic display with the center of said arc coincident with a line normal to said panel and passing through said minimum distance point.
   clock means engaging the other end of said shaft on the side of said panel opposite the side on which said dial is positioned for rotating said shaft at a uniform speed,
   a lever arm positioned on and parallel to said opposite side of said panel,
   means pivotally supporting said lever arm at one end at a point coincident with a line normal to said instrument panel and passing through said minimum distance point,
   said lever arm extending laterally beyond the edge of said panel and supporting said clock means and shaft intermediate its ends for movement over said arc,
   means forming speed calibrations along said edge of said panel along a distance over which said arc may be moved, and
   means at the free end of said lever for indicating said speed calibrations in relation to time as measured on said indicator means and distance as measured on said instrument panel.

References Cited by the Examiner
UNITED STATES PATENTS

| | | | |
|---|---|---|---|
| 2,289,038 | 7/1942 | Putnam | 58—152 |
| 2,416,772 | 3/1947 | Reece | 235—61 |
| 2,508,898 | 5/1950 | Stronstorff | 235—61 |
| 2,724,552 | 3/1964 | Sherwood | 235—78 |
| 3,127,102 | 3/1964 | Fallis | 235—61 |

LEO SMILOW, *Primary Examiner.*